(12) United States Patent
Kawano et al.

(10) Patent No.: US 8,390,586 B2
(45) Date of Patent: Mar. 5, 2013

(54) IMAGE DISPLAY APPARATUS THAT DETECTS POINTING ELEMENT USING IMAGING DEVICE

(75) Inventors: Kiyohiko Kawano, Osaka (JP); Hiroshi Noge, Tokyo (JP); Hideki Ueda, Osaka (JP)

(73) Assignee: Panasonic Corporation, Osaka (JP)

( * ) Notice: Subject to any disclaimer, the term of this patent is extended or adjusted under 35 U.S.C. 154(b) by 233 days.

(21) Appl. No.: 12/702,595

(22) Filed: Feb. 9, 2010

(65) Prior Publication Data
US 2010/0141897 A1    Jun. 10, 2010

Related U.S. Application Data

(63) Continuation-in-part of application No. PCT/JP2008/064327, filed on Aug. 8, 2008.

(30) Foreign Application Priority Data

Aug. 10, 2007    (JP) .................................. 2007-209748

(51) Int. Cl.
*G06F 3/041*    (2006.01)
*G06F 3/042*    (2006.01)

(52) U.S. Cl. ........................................ 345/173; 345/175

(58) Field of Classification Search .................... 353/34; 345/168, 173; 250/221
See application file for complete search history.

(56) References Cited

U.S. PATENT DOCUMENTS

| | | | |
|---|---|---|---|
| 5,532,765 A * | 7/1996 | Inoue et al. | 348/807 |
| 6,120,374 A | 9/2000 | Akada et al. | |
| 6,310,662 B1 | 10/2001 | Sunakawa et al. | |
| 6,512,507 B1 * | 1/2003 | Furihata et al. | 345/157 |
| 6,788,289 B2 * | 9/2004 | Kitazawa | 345/158 |
| 2002/0075240 A1 | 6/2002 | Lieberman et al. | |
| 2005/0168700 A1 * | 8/2005 | Berg et al. | 353/34 |
| 2006/0026533 A1 | 2/2006 | Napoli et al. | |

(Continued)

FOREIGN PATENT DOCUMENTS

| | | |
|---|---|---|
| EP | 1710665 | 10/2006 |
| JP | 08-009309 | 1/1996 |

(Continued)

OTHER PUBLICATIONS

Eurepean Search Report, dated Jun. 4, 2012.

*Primary Examiner* — Thanh Luu
*Assistant Examiner* — Renee Naphas
(74) *Attorney, Agent, or Firm* — Greenblum & Bernstein, P.L.C.

(57) ABSTRACT

An image display apparatus includes an LD for emitting and modulating visible light, an optical scanning device for two-dimensionally scanning the light from the Ld on a screen in synchronism with the LD, an imaging device for picturizing an image of the image displayed on the screen, and an image processor for judging presence or absence of the pointing element such as a finger or fingers which is/are used to point out an optional position on the image based on temporal change of the image picturized by the imaging device. Even when the finger or fingers of a person is/are used as the pointing element, it is possible to judge the presence or absence of the pointing out of the image by the finger or fingers. Thereby, a number of components can be reduced. In addition, in comparison with an image display apparatus that emits invisible light detects a position of a pointing element corresponding to a photoreception timing of the invisible light reflected by the pointing element, a complex detection circuit having a high time-resolution becomes unnecessary, and it enables to simplify the configuration and to reduce manufacturing cost.

11 Claims, 9 Drawing Sheets

| U.S. PATENT DOCUMENTS | | | |
|---|---|---|---|
| 2006/0101349 A1 | 5/2006 | Lieberman et al. | |
| 2006/0221063 A1* | 10/2006 | Ishihara | 345/173 |
| 2007/0159453 A1 | 7/2007 | Inoue | |
| 2009/0268095 A1 | 10/2009 | Hoshino et al. | |
| 2010/0033692 A1 | 2/2010 | Watanabe et al. | |
| 2010/0039426 A1 | 2/2010 | Matsumoto et al. | |

| FOREIGN PATENT DOCUMENTS | | |
|---|---|---|
| JP | 11-095895 | 4/1999 |
| JP | 2003-535405 | 11/2003 |
| JP | 2006-277357 | 10/2006 |
| WO | 2006/022912 | 3/2006 |

\* cited by examiner

IMAGE DISPLAY APPARATUS THAT DETECTS POINTING ELEMENT USING IMAGING DEVICE

This application is a Continuation-in-part of pending International application PCT/JP2008/64327, filed on Aug. 8, 2008, which claims priority of Japanese Application 2007-209748, filed Aug. 10, 2007, each of which is incorporated herein by reference in its entirety.

TECHNICAL FIELD

The present invention relates to an image display apparatus which can display an image on a screen by two-dimensionally scanning visible light from a light source on the screen by an optical scanning device.

BACKGROUND ART

Figure 13:
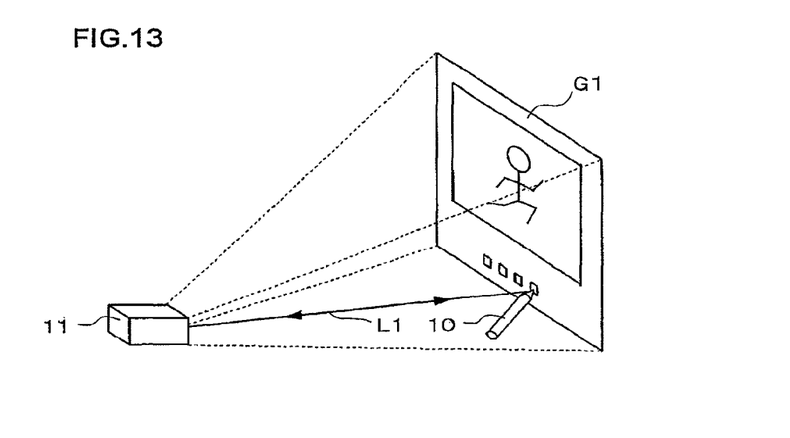
FIG. 13 is a drawing of configuration of a conventional image display apparatus.

As shown in FIG. 13, an image display apparatus, which emits invisible light L1 from a light emitting device 11 to a pointing device 10 for detecting a position of the pointing device 10 which is used to point out an optional position on an image G1, is conventionally known (see Japanese Laid-Open Patent Publication No. 2006-277357, for example). In such image display apparatus, a retroreflector member, which deflects the invisible light L1 from the light emitting device 11 and reflects the invisible light L1 to the incident direction, is provided on the pointing device 10. The invisible light L1 which is reflected by the pointing device 10 is received by a photoreception means in the light emitting means 11. The position of the pointing device 10 is estimated based on a photoreception timing of the invisible light by the photoreception device.

By the way, it is difficult to substitute the pointing device 10 with a finger or fingers of a person in the conventional technology, so that it is difficult to reduce a number of components. In addition, the conventional apparatus requires a high time-resolution in order of pico-second (ps) for positional detection based on the photoreception timing of the reflected light, and thus, it needs a complicated and high-performance detect circuit. Thereby, manufacturing cost rises.

DISCLOSURE OF INVENTION

The present invention is conceived to solve the above mentioned conventional problems and purposed to provide an image display apparatus which enables to judge the presence or absence of pointing out of an image even when a finger or fingers of a person is or are used as a pointing means to point out an optional position on the image, and consequently enables to reduce a number of components, to simplify a configuration and to reduce manufacturing cost.

In order to achieve the above mentioned purpose, an image display apparatus of the present invention comprises: a light source which emits visible light; a scanner which two-dimensionally scans light emitted from the light source to display an image on a screen in synchronism with the light source; a controller which controls the light source and the scanner based on a data of an image to be displayed on the screen; an imaging device which picturizes an image of the image displayed on the screen; and a judger which judges presence or absence of a pointing element between the optical scanning device and the screen, which is used to point out an optional position on the image based on temporal change of the image picturized by the imaging device.

According to such a configuration, the image displayed on the screen and the image picturized by the imaging device temporally change responding to presence or absence of the pointing elements between the optical scanning device and the screen, and the presence or absence of the pointing out of the image by the pointing element is judged on the basis of the temporal change of the image picturized by the imaging device, so that the presence or absence of the pointing out of the image can be judged even when a finger or fingers of a person or the like is used as the pointing element. Thus, it is possible to reduce a number of components. In addition, in comparison with a conventional image display apparatus that emits invisible light, receives the invisible light reflected by the pointing device and detects a position of the pointing device responding to photoreception timing, a complex detection circuit having a high time-resolution becomes unnecessary, so that it is possible to simplify the configuration and to reduce the manufacturing cost.

BEST MODE FOR CARRYING OUT THE INVENTION

An image display apparatus in accordance with a first embodiment of the present invention is described below with reference to FIG. 1 to FIGS. 6A to 6D. First, a configuration of the image display apparatus is described with reference to FIG. 1. This image display apparatus 1 displays an image G1 by projecting light on a screen P1, detects pointing out and a position thereof on the image G1 by a finger or fingers of a person or the like by taking an image of the image G1, and switches the display of the image G1 responding to a result of the detection, for example.

Figure 1:
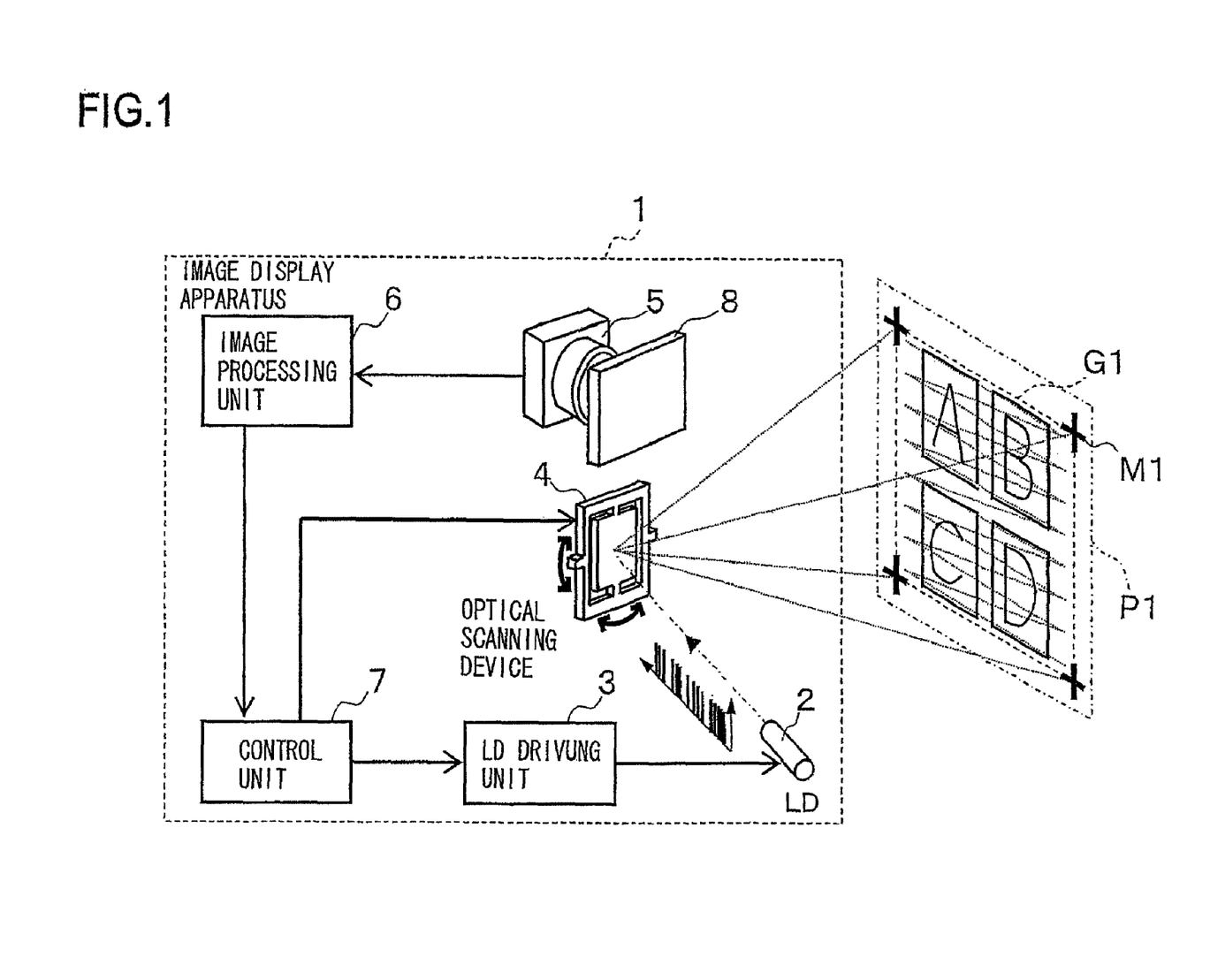
FIG. 1 is a drawing showing a configuration of an image display apparatus in accordance with a first embodiment of the present invention.

The image display apparatus 1 comprises a laser diode (hereinafter, abbreviated as "D") 2 which emits visible light, an LD driver 3 which is configured by a driving circuit for driving the LD 2, an optical scanning device (scanner) 4 which two-dimensionally scans the visible light from the LD 2 on a screen P1. The LD driver 3 displays an image G1 and reference marks M1 on the screen P1 by modulating light output of the LD 2 and emits the modulated visible light from the LD 2. The LD 2 and the LD driver 3 constitute a light source by this manner. In addition, the image display apparatus 1 comprises an imaging device 5 which picturizes an image of the image G1 and the reference marks M1 displayed on the screen P1 by the LD 2, the LD driver 3 and the optical scanning device 4 (hereinafter, abbreviated as "LD 2 and so on"). Hereinafter, the image G1 and the reference marks M1 picturized by the imaging device 5 are respectively called "picturized image G2" and "picturized reference marks M2".

The image display apparatus 1 further comprises an image processor 6 which processes the picturized image G2 based on the picturized reference marks M2 and a controller 7 which controls the LD driver 3 and the optical scanning device 4 responding to the image G1 to be displayed or signals from the image processor 6. The LD driver 3 and the optical scanning unit 4 are synchronously driven by the controller 7. The image processor (judger) 6 judges whether pointing element which is used to point out an optional position on the image G1 exists or not based on temporal change of the processed picturized image G2. Such a pointing element is not limited in particular, and it is sufficient to be a material object such as a finger or fingers of a person or a pen.

A filter 8, which is formed of an optical material enabling to pass through only a visible light of the same color as the visible light from the LD 2, is provided between the screen P1 and the imaging unit 5. The LD 2 and so on, the image processor 6 and the controller 7 are built in a housing (not illustrated) of a main body of the apparatus. The imaging unit 5 and the filter 8 may be provided inside the housing of the main body of the apparatus or outside of the housing.

The LD 2 and so on display the image G1 including keys or the like in a rectangular shape with the visible light of a single color, for example, and display the reference marks M1 at four corners thereof. In FIG. 1, alphabets A, B, C and D are illustrated as examples of the keys in the image G1. The reference marks M1 each having a shape of a cross, for example, are displayed so that cross points coincide with the corners of the image G1. Shape of the image G1, a number, positions and shapes of the reference marks M1 are not limited as above in particular.

The optical scanning device 4 is configured of a polygon mirror, a galvanometer mirror or a MEMS (Micro Electro Mechanical Systems) or a combination of them, for example, and it enables to scan the visible light emitted from the LD 2 in two directions of vertical direction and horizontal direction, that is, biaxial direction. The biaxial optical scanning enables to project a two-dimensional image G1 on the screen P1.

The imaging device 5 is configured of a CCD camera or a CMOS camera and so on. Only the visible light of the same color as the visible light from the LD 2 enters into the imaging unit 5 by the function of the filter 8. Picturizing operations of the image G1 and the reference marks M1 by the imaging device 5 is executed at a predetermined time period. Data of the picturized image G2 and the picturized reference marks M2 are outputted from the imaging device 5 to the image processor 6. When the imaging device 5 is provided outside the housing of the main body of the apparatus, it transmits the data to the image processing unit via wires or radio.

Figure 2:
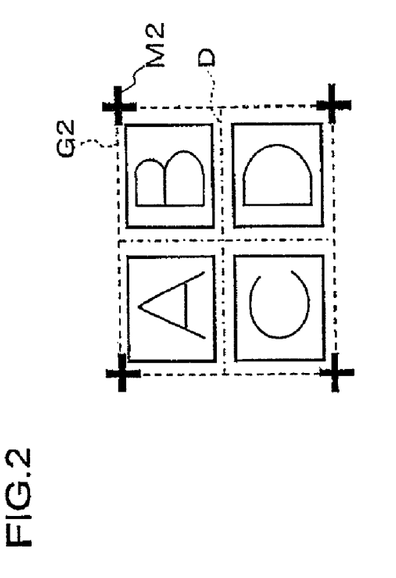
FIG. 2 is a drawing showing a picturized image by an imaging unit of the above apparatus.

The image processor 6 is configured by a microcomputer including CPU and so on. The image processor 6 binarize shading value of each pixel of the picturized image G2 based on the data of the picturized image G2 and the picturized reference marks M2 outputted from the imaging device 5 and divide the picturized image G2 using the picturized reference marks M2 as criteria. When the image G1 includes a plurality of keys, the image processor 6 divides the picturized image G2 along a plurality of dividing lines to carve up the picturized image G2 corresponding to the keys. As shown in FIG. 2, when a plurality of the alphabet keys are arranged to a matrix of 2×2, and fully displayed on the picturized image G2, for example, a vertical and a horizontal dividing lines D (illustrated by two-dotted chain lines) are respectively specified at a substantially center of the upper and lower picturized reference marks M2 in the figure and at a substantially center of the left and right picturized reference marks M2. By these dividing lines D, the picturized image G2 is divided and carved into four keys.

In addition, the image processor 6 detects temporal change in each divided images G2. Specifically, the image processor 6 compares a current picturized image G2 with a previous picturized image temporally in each divided picturized image G2, and detects reduction of an area of a character or a key frame (hereinafter, it is called "character or the like") in the picturized image G2, that is reduction of a number of pixels that form the character or the like. Such reduction of the number of pixels occurs due to a certain pointing out on the image G1 by the pointing means. When the image processor 6 detects the pointing means on a specific picturized image among the divided picturized images G2, that is, when detecting the pointing out of a specific position of the image G1 by the pointing means, it outputs detection information to the controller 7.

Figure 3A:
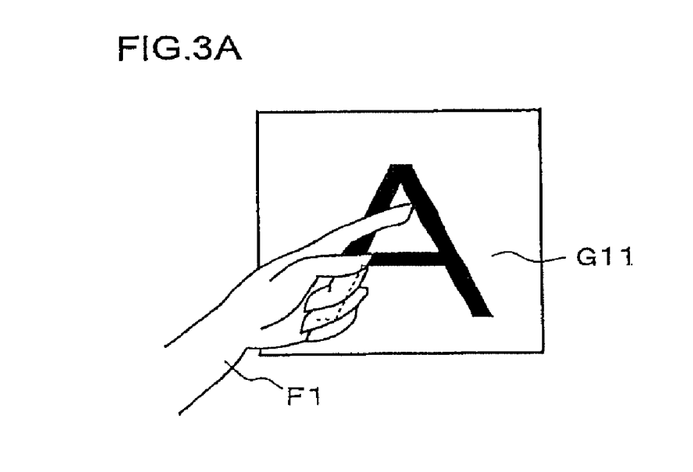
FIG. 3A is a drawing showing a state that an image is pointed out by a user.
Figure 3B:
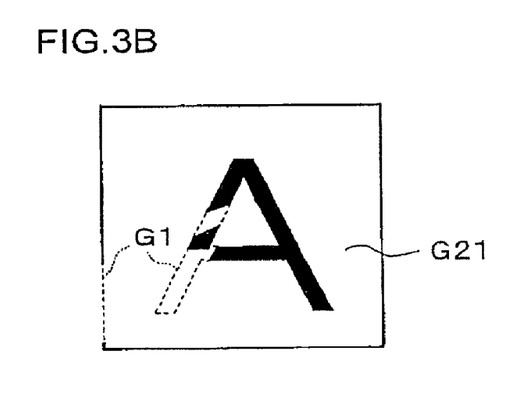
FIG. 3B is a drawing showing the picturized image at that time.

Hereupon, the reduction of an area of character or the like in a divided picturized image G2 is described with reference to an example. It is assumed that a key image G11 of alphabet "A" is pointed out with fingers F1 in an image including a plurality of keys by a user as shown in FIG. 3A, so that key-touching operation of the key image G11 is performed. At this time, as shown in FIG. 3B, a picturized image of the key image G11 which is obtained by dividing in the image processor 6 (hereinafter, it is called "picturized key image G21") becomes a shape that a part of a character or the like therein is hollowed. Specifically, a portion "g" of the character or the like in the picturized key image G21, which corresponds to a portion of the key image G11 covered by fingers F1 or a hand, becomes a shape which is hollowed to correspond to the shape of the fingers F1 or the hand and so on. Consequently, the area of the character or the like in the picturized key image G21 is reduced in comparison with that before key-touching operation. That is, the number of pixels forming the character or the like is reduced. Therefore, it is possible to detect the key-touching of the key image G11, that is, the pointing out of the key image G11 by the pointing means such as fingers F1 or the like by detecting the reduction of the number of pixels.

The controller 7 is configured of the microcomputer including CPU and so on. Data of the image G1 to be displayed is inputted to the microcomputer and so on from an external apparatus such as a personal computer or the like. The microcomputer and so on controls the LD 2 and so on responding to the inputted data of the image G1. The data of the image G1 may be stored in a memory provided in the controller 7.

Figure 4:
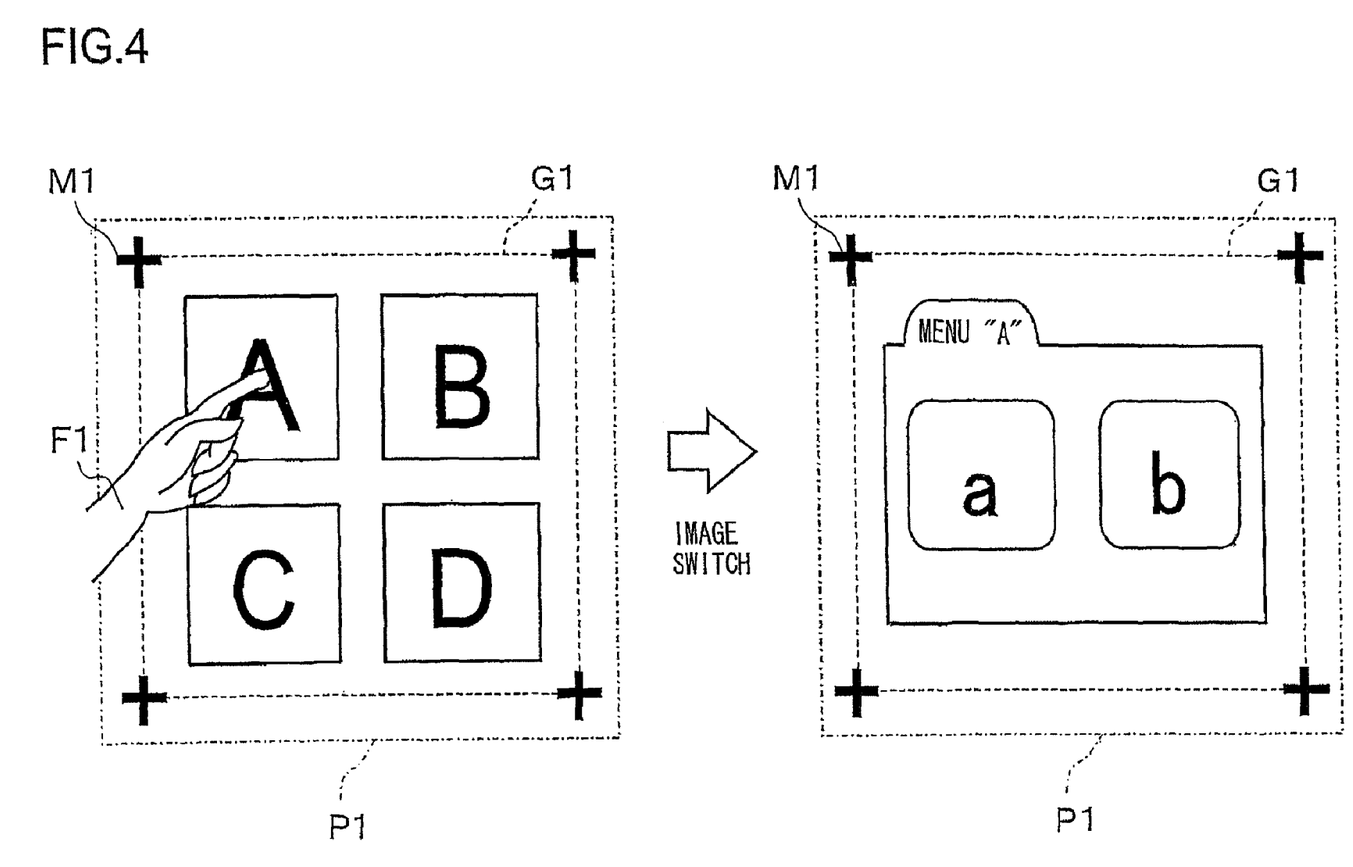
FIG. 4 is a drawing showing an example of image switch by the above apparatus.

In addition, the controller 7 controls the LD 2 depending on detection information outputted from the image processor 6. The LD 2 and so on switches the display of the image G1 on a screen responding to a picturized image on which the pointing means is detected among the divided picturized images G2. As for the switching of the display of the image G1, hierarchical display of menus shown in FIG. 4 can be exemplified. Specifically, a plurality of keys (illustrated as A, B, C and D keys) which show various kinds of menus are displayed in the image G1, and when a menu is selected by pointing one of them by a finger or fingers F1 of the user, keys (illustrated as "a" and "b" keys) which show low-order menus depending on the menu are displayed as an image G1. In such hierarchical display of menus, images showing menus are not limited to the keys, and they may be tags. In addition, page skip or page return may be performed by switching display of the image other than hierarchical display of menus.

In the image display apparatus 1 in this embodiment, the picturized image G2 is temporally changed corresponding to presence or absence of the pointing means on the image G1, and presence or absence of the pointing out of the image by the pointing means is judged depending on the change, so that, even when a finger or fingers of a person is or are used as the pointing means, it is possible to judge whether the pointing out of the image by the finger or fingers of the person presences or not. Thereby, a number of components can be reduced. In addition, in comparison with a conventional image display apparatus that emits invisible light, receives the invisible light reflected by the pointing means and detects a position of the pointing means responding to photoreception timing, a complex detection circuit having a high time-resolution becomes unnecessary, so that it enables to simplify the configuration and to reduce the manufacturing cost.

Since the filter 8 passes only the visible light of the same color as the visible light emitted from the LD 2 and shields lights of other colors, the image G1 and the reference marks M1 which are displayed by the visible light from the LD 2 can be extracted by the filter 8, and thus, the imaging device 5 can picturize the extracted ones. Therefore, temporal change of the picturized image G1 can be judged in high accuracy. Accordingly, it is judged whether a part of the image G1 is covered due to pointing out of the image by the pointing means or not, that is, presence or absence of the pointing means on the image G1 can be judged in high accuracy.

It is possible to detect the pointing out of the image G1 and the position of the pointing out using the pointing means by the user by detecting the temporal change of the above mentioned picturized image G2. Therefore, by including a plurality of keys in the image G1 and dividing the picturized image G2 to carve to each keys, it is possible to regard the image G1 as an operation panel and to regard the pointing out of the divided picturized images G2 as key-touching operation. Since the display of the image G1 is switched by the key-touching operation, the screen P1 can be used as a touch-screen.

Figure 5:
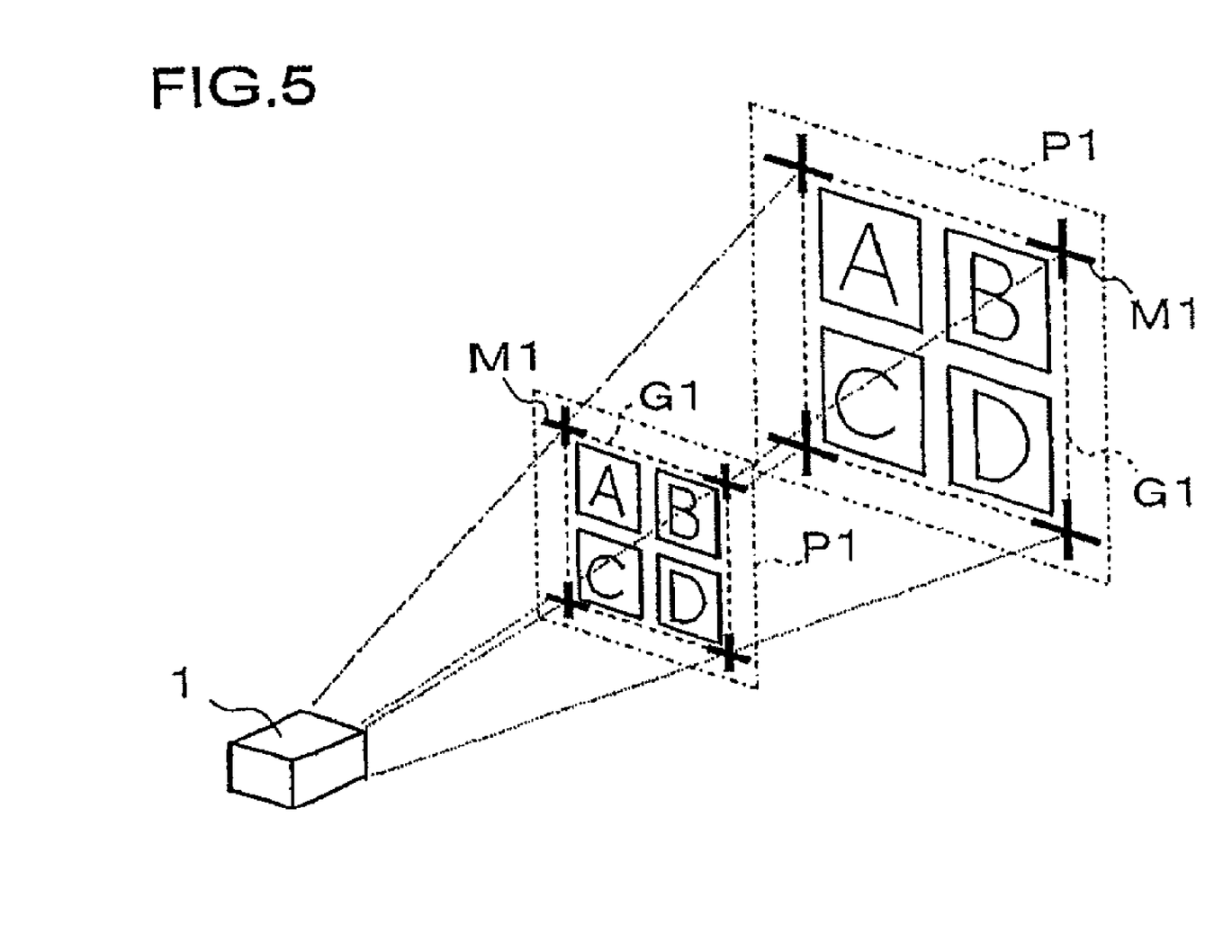
FIG. 5 is a drawing showing a variation of an image responding to a distance between a screen on which an image is displayed and the above apparatus.

Subsequently, effects showing the reference marks M1 are described with reference to FIG. 5 and FIGS. 6A to 6D. As shown in FIG. 5, when a distance between the image display apparatus 1 and the screen P1 varies, the shape of the image G1 is not varied, but the size of the image G1 varies corresponding to the distance. Although the positions of the reference marks M1 vary responding to variation of the size of the image G1, the reference marks M1 are displayed at four corners with no relation to the size of the image G1. Therefore, positional relations between the image G1 and the reference marks M1 are invariant with no relation to the above distance. Since the picturized image of the image G1 is divided using the picturized reference marks and presence or absence of the pointing out of the image by the pointing means in each divided picturized image, the portion pointed out by the pointing means in the image G1 can be derived with the reference marks M1 with no relation to the distance between the image display apparatus 1 and the screen P1.

Figure 6A:
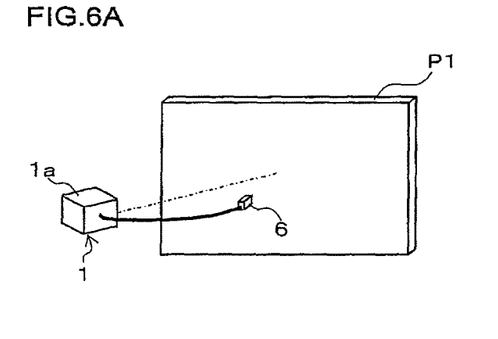
FIG. 6A is a perspective illustration showing a state that the above apparatus projects an image from diagonal side of the screen.

When the main body 1a of the image display apparatus 1 exists at a position having an angle in a horizontal direction from a position facing the center of the screen P1 and the imaging unit 5 is outside the housing of the main body 1a of the apparatus but positioned at the position facing the center of the screen P1 as shown in FIG. 6A, the picturized image G2 becomes a trapezoid that the left vertical side is shorter than the right vertical side not the rectangle.

Figure 6B:
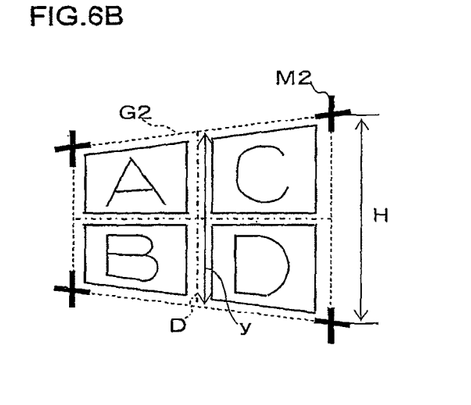
FIG. 6B is a drawing showing a picturized image by the above imaging unit at that time.

Hereupon, when the vertical lengths of both vertical sides of the picturized image G2 are different from each other, the length of the longer vertical side is used as a reference length H, and when the vertical lengths of both vertical sides of the picturized image G2 are substantially even, the vertical lengths are used as the reference length H. In addition, a vertical length at an optional position in the picturized image G2 is designated by a character "y". Then, a value obtained by calculating a mathematical formula $(H-y)/H \times 100$ is called compression ratio of the picturized image G2. The picturized image G2 shown in FIG. 6B is regarded as a shape compressed in vertical direction in a manner so that the compression ratio is gradually increased from a side to the other side in horizontal direction.

Figure 6C:
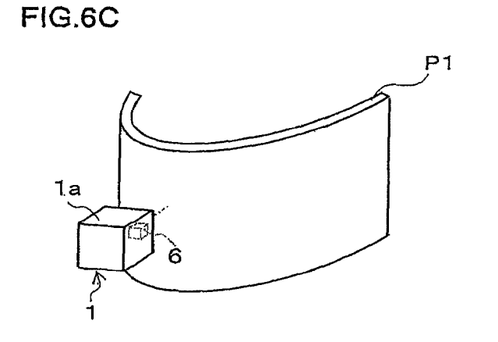
FIG. 6C is a perspective illustration showing a state when the screen on which an image is displayed is formed to be a curved surface.
Figure 6D:
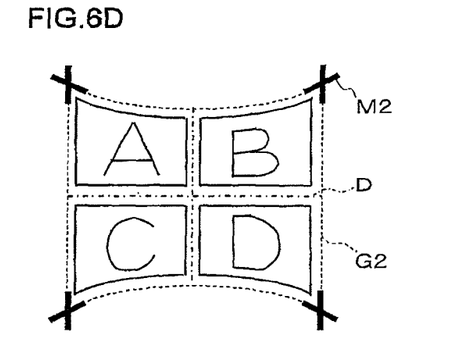
FIG. 6D is a drawing showing a picturized image by the imaging unit at the time.

When the main body 1a of the apparatus exists at a position facing the center of the screen P1, the imaging device 5 is built in the housing of the main body 1a of the apparatus and a horizontal section pg the screen P1 forms a curve convex to the image display apparatus 1 as shown in FIG. 6C, the picturized image G2 becomes a shape compressed in vertical direction from both side to the center in horizontal direction as shown in FIG. 6D Since the reference marks M1 are displayed at four corners of the image G1, even when shape distortion occurs in the picturized image G2, the positional relations between the picturized image G2 and the picturized reference marks M2 are invariant with no relation to the projection direction of the image G1 to the screen P1 and the shape of the screen P1. Therefore, it is possible to set the dividing lines D based on the positional relations of the picturized reference marks M2, the picturized image G2 is divided along the dividing lines D, and presence or absence of the pointing out of the image by the pointing means in each divided picturized images G2 is judged. Therefore, the pointed portion on the image G1 can be derived using the reference marks M1 with no relation to the projection direction of the image G1 to the screen p1 and the shape of the screen P1.

When a user points out a desired portion on an image G1 using the pointing means such as a finger or fingers, another portion may be covered by the pointing means or a human body of the user. In case that the covered area is small in a portion of the picturized image G2 corresponding to the portion, a reduction number of pixels, which forms the character or the like, becomes small. In case that the covered area is large, the above reduction number of pixels becomes large. Therefore, for preventing erroneous detection of the pointing out, it is preferable to establish an upper limit and a lower limit previously for the reduction number of pixels, which serves as references to judge the presence or absence of the pointing out of the image. When the reduction number of the pixels is equal to or larger than the lower limit and equal to or smaller than the upper limit, the image processing unit 6 preferably judges that the pointing out by the pointing means is existed.

In this case, even when another portion which is other than the portion that the user wishes to point out is covered by the pointing means or a body of the user, the reduction number of the pixels which forms the character or the like in the portion is out of the predetermined range, it is not judged that the portion is pointed out. Thereby, erroneous detection of the pointing out can be restricted.

Subsequently, an image display apparatus in accordance with a second embodiment of the present invention is described with reference to FIG. 7 to FIGS. 12A to 12C. Since a configuration of the image display apparatus in this embodiment is the same as that in the first embodiment, the configuration is described to divert FIG. 1. The image display apparatus 1 of this embodiment is different that the image processor (image compensator) 6 performs a process to compensate an image G1 referring to positional relations to a screen P1 on which the image G1 is displayed or a shape of the screen P1 or the like (hereinafter, it is called "positional relations to the screen P1 or the like") in comparison with the first embodiment. The image processor 6 detects inclination or distortion of picturized reference marks M2 which occurs due to the positional relations to the screen P1 or the like, and estimates the positional relations to the screen P1 or the shape of the screen P1 corresponding to the detection result. Then, the image processor 6 compensates the image G1 based on the estimation result.

Hereupon, an example of the positional relations to the screen P1 and the distortion of the picturized reference marks M2 corresponding thereto, and the estimation process in the image processor 6 responding to the distortion are described with reference to FIG. 7 and FIGS. 8A to 8F, first.

As shown in the above FIG. 6A, when the main body 1a of the image display apparatus 1 exists at the position having an angle in a horizontal direction from the position facing the center of the screen P1 and the imaging device 5 is outside the housing of the main body 1a of the apparatus but positioned at the position facing the center of the screen P1, the picturized image G2 becomes a distorted shape, for example. At that time, the vertical lines of the picturized reference marks M2 are not varied from the case that no distortion exists, but horizontal lines of them incline.

Figure 7:
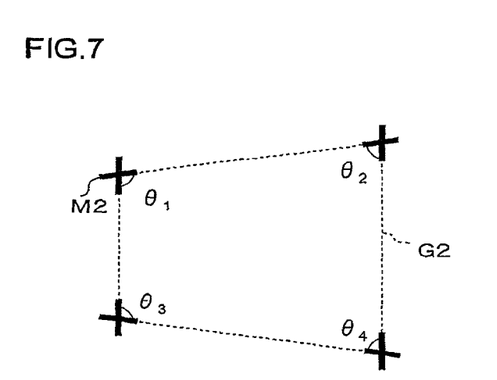
FIG. 7 is a drawing showing internal angles of a picturized image when an image display apparatus in accordance with a second embodiment of the present invention projects an image from diagonal side of a screen.

When the image display apparatus 1 is positioned at a position having an angle in clockwise direction to the screen P1 in planar observation, the horizontal lines incline in respective picturized reference marks M2 at upper left, upper light, lower left and lower right positions in the figure, and internal angles .1, .2, .3 and .4 of the picturized image G2 which are shown by vertical lines and the horizontal lines satisfy mathematical formulae .1 . . . .3>90 degrees and .2 . . . . 4<90 degrees, as shown in FIG. 7. Accordingly, when the image processor 6 calculates that the internal angles .1 to .4 satisfy the mathematical formulae, it is estimated that the image display apparatus 1 projects the image G1 and the reference marks M1 to the screen P1 from the position having an angle in clockwise direction to the screen P1 in planar observation.

Figure 8A:
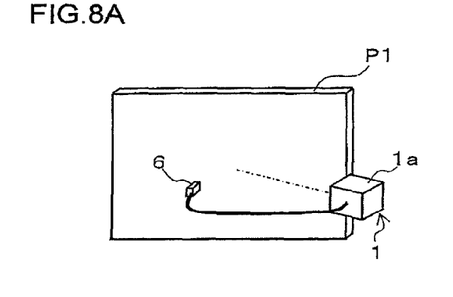
FIG. 8A is a perspective illustration showing a state that the above apparatus projects an image from a direction in diagonal side of the screen but different from the above.
Figure 8B:
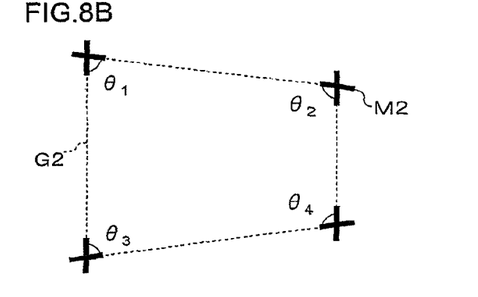
FIG. 8B is a drawing showing internal angles of a picturized image at that time.
Figure 8C:
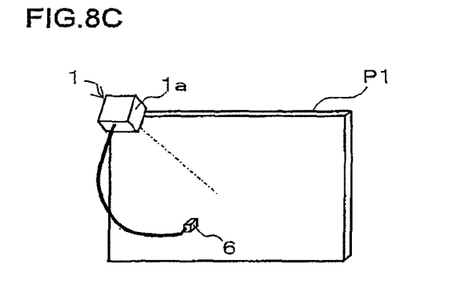
FIG. 8C is a perspective illustration showing a state that the apparatus projects an image from diagonal above of the screen.
Figure 8D:
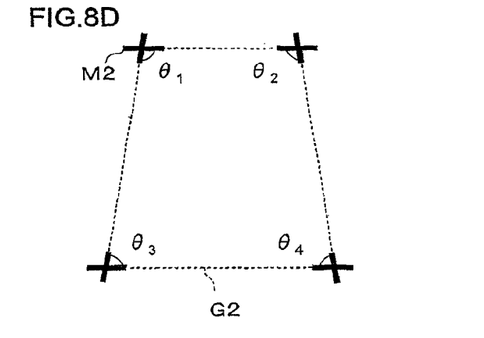
FIG. 8D is a drawing showing internal angles of a picturized image at that time.
Figure 8E:
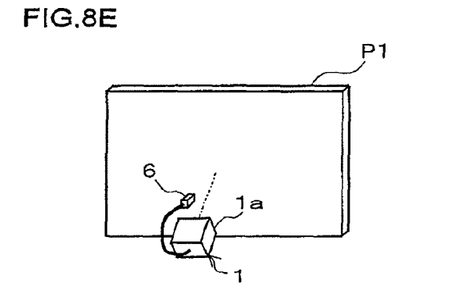
FIG. 8E is a perspective illustration show a state that the apparatus projects an image from diagonal below of the screen.
Figure 8F:
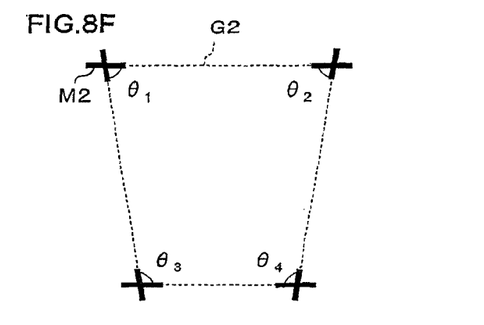
FIG. 8F is a drawing showing internal angles of a picturized image at that time.

Similar to the above, when the main body 1a of the apparatus is positioned at a position having an angle from a position facing a center of the screen P1 in counterclockwise direction to the screen P1 in planar observation as shown in FIG. 8A, the internal angles .1, .2, .3 and .4 satisfy mathematical formulae .1 . . . .3<90 degrees and .2 . . . .4>90 degrees, as shown in FIG. 8B. Alternatively, when the main body 1a of the apparatus is positioned at a position having an angle from a position facing a center of the screen P1 in clockwise direction to the screen P1 in side observation as shown in FIG. 8C, the internal angles .1, .2, .3 and .4 satisfy mathematical formulae .1 . . . .2>90 degrees and .3 . . . .4<90 degrees, as shown in FIG. 8D. Alternatively, when the main body 1a of the apparatus is positioned at a position having an angle from a position facing a center of the screen P1 in counterclockwise direction to the screen P1 in side observation as shown in FIG. 8E, the internal angles .1, .2, .3 and .4 satisfy mathematical formulae .1 . . . .2<90 degrees and .3 . . . .4>90 degrees, as shown in FIG. 8F. Accordingly, the image processing unit 6 estimates the positional relations to the screen P1 based on the above mathematical formulae that the internal angles .1, .2, .3 and .4 satisfy.

Subsequently, an example of the shape of the screen P1 and the distortion of the picturized reference marks M2 corresponding thereto, and the estimation process in the image processing unit 6 responding to the distortion are described with reference to FIG. 9 and FIGS. 10A to 10F.

Figure 9:
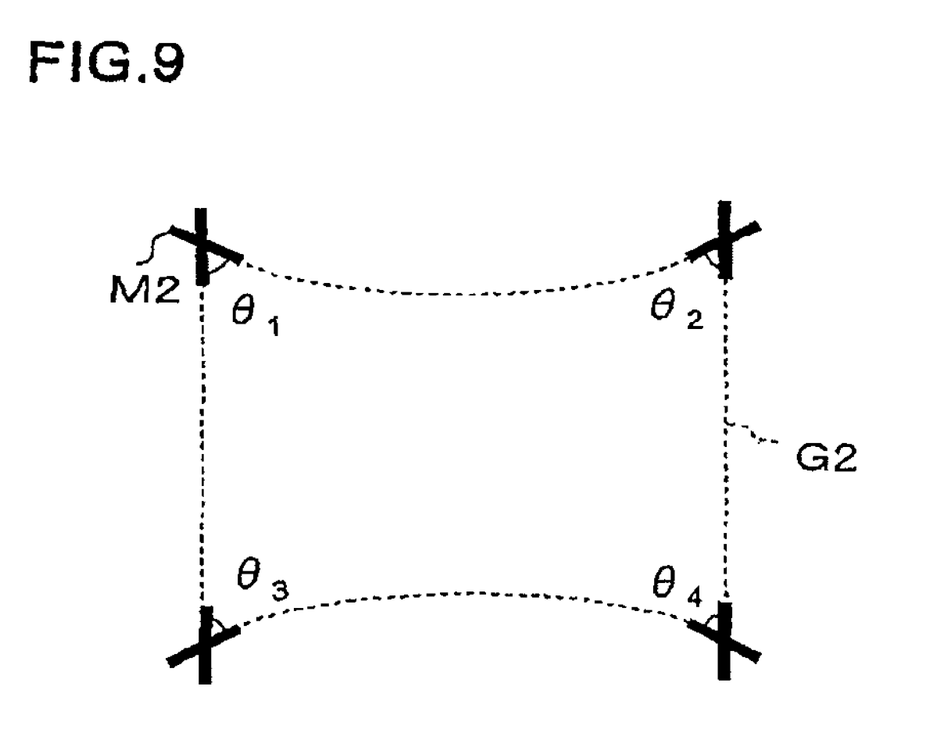
FIG. 9 is a drawing showing internal angles and picturized reference marks of a picturized image by the above apparatus when a horizontal section of the screen on which the image is displayed is curved.

As shown in the above FIG. 6C, when the main body 1a of the apparatus exists at the position facing the center of the screen P1 and the imaging device 5 is built in the housing of the main body 1a of the apparatus, and the horizontal section of the screen P1 forms a curve convex to the image display apparatus 1, the vertical lines are not varied from the case that no distortion exists, but the horizontal lines incline toward the center of the picturized image G2 (hereinafter, it is called "directions to the center of the image") in the picturized reference marks M2, as shown in FIG. 9. Then, the internal angles .1, .2, .3 and .4 satisfy mathematical formula .1 . . . . 2 . . . .3 . . . .4<90 degrees. Therefore, when the image processing unit 6 detects the inclination of the horizontal lines of the picturized reference marks M2 toward the center of the image and calculates that the internal angles .1 to .4 satisfy the mathematical formula, it is estimated that the horizontal section of the screen P1 forms a curve convex to the image display apparatus 1.

Figure 10A:
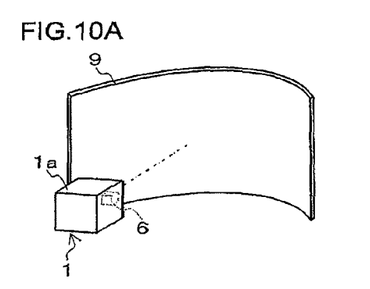
FIG. 10A is a perspective illustration showing a state that the horizontal section of the above screen is curved to different direction from the above.
Figure 10B:
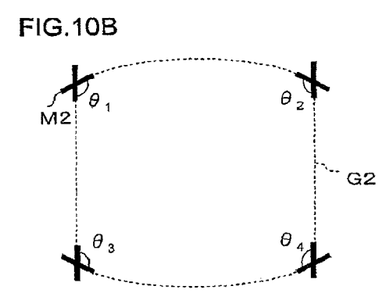
FIG. 10B is a drawing showing internal angles and inclination of the picturized reference marks of a picturized image at that time.
Figure 10C:
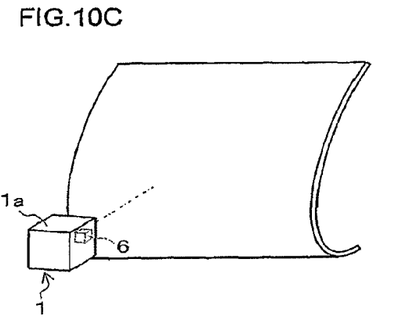
FIG. 10C is a perspective illustration showing a state that a vertical section of the screen is curved.
Figure 10D:
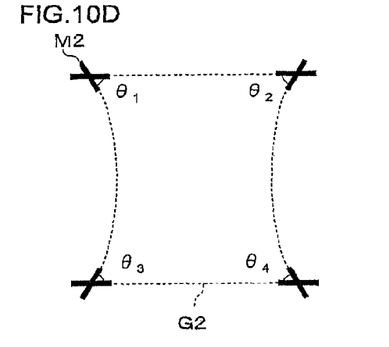
FIG. 10D is a drawing showing internal angles and inclination of the picturized reference marks of a picturized image at that time.
Figure 10E:
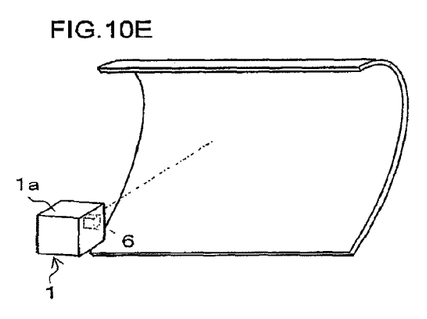
FIG. 10E is a perspective illustration showing a state that the vertical section of the screen is curved to different direction from the above.
Figure 10F:
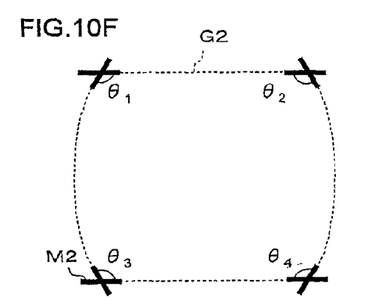
FIG. 10F is a drawing showing internal angles and inclination of the picturized reference marks of a picturized image at that time.

Similar to the above, when the horizontal section of the screen P1 forms a curve convex to a distance from the image display apparatus 1 as shown in FIG. 10A, the horizontal lines of the picturized reference marks M2 incline in opposite directions to the directions to the center of the image and the internal angles.1, .2, .3 and .4 satisfy mathematical formulae .1 . . . .2 . . . .3 . . . .4>90 degrees, as shown in FIG. 10B. Alternatively, when the horizontal section of the screen P1 forms a curve convex to the image display apparatus 1 as shown in FIG. 10C, the vertical lines of the picturized reference marks M2 incline in the directions to the center of the image and the internal angles.1, .2, .3 and .4 satisfy mathematical formulae .1 . . . .2 . . . .3 . . . .4<90 degrees, as shown in FIG. 10D. Alternatively, when the vertical section of the screen P1 forms a curve convex to the image display apparatus 1 as shown in FIG. 10E, the vertical lines of the picturized reference marks M2 incline in directions opposite to the directions to the center of the image and the internal angles.1, .2, .3 and .4 satisfy mathematical formulae .1 . . . . 2 . . . .3 . . . .4>90 degrees, as shown in FIG. 10F. Therefore, when the image processing unit 6 detects the inclination of the horizontal lines or vertical lines of the picturized reference marks M2 toward the center of the image and calculates that the internal angles.1 to .4 satisfy the mathematical formula, it is estimated that the shape of the screen P1.

Figure 11A:
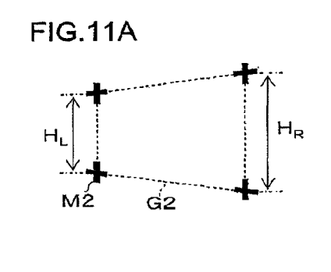
FIG. 11A is a drawing showing a picturized image by the apparatus before image compensation when the above apparatus projects an image from diagonal side of the screen.
Figure 11B:
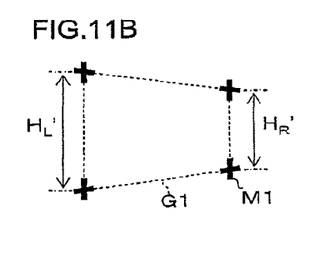
FIG. 11B is a drawing showing an image projected in the image compensation by the apparatus.
Figure 11C:
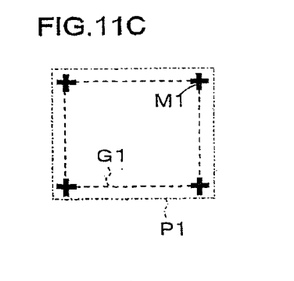
FIG. 11C is a drawing showing an image actually displayed at that time.

Subsequently, the image compensation process in the image processor 6 is described with reference to FIGS. 11A to 11C and FIG. 12A to 12C. When the main body 1a of the apparatus 1 exists at the position having an angle in clockwise direction from the position facing the center of the screen P1 in planar observation and the imaging device 5 is positioned at the position facing the center of the screen P1 as shown in the above FIG. 6A, distortions occur in the picturized image G2 as shown in FIG. 11A, and a relation $H_L<H_R$ is concluded between a vertical length $H_L$ of a left side and a vertical length $H_R$ of a right side in the figure. The image processing unit 6 calculates quantities of distortions in the picturized image G2. Then, the image processor 6 instructs the controller 7 to project an image G1 in which a relation $H_L'>H_R'$ is concluded between a vertical length $H_L'$ of a left side and a vertical length $H_R'$ of a right side as shown in FIG. 11B, based on the calculation result. The controller 7 controls the LD 2 and so on and the optical scanning device 4 based on this instruction, and the LD 2 and so on compensates the image G1 based on this control. As a result of the above image compensation, the image G1 actually displayed on the screen P1 becomes a desired shape, for example, a rectangular shape shown in FIG. 11C. In addition, the image processor 6 may narrow the width of scanning by the optical scanning device 4 and modulate light outputs of the LD 2 corresponding thereto so as to display the image G1 compressing in horizontal direction entirely. In such a case, it is possible to prevent that the image G1 is displayed expanding in horizontal direction on the screen P1.

Figure 12A:
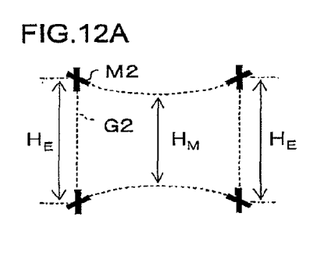
FIG. 12A is a drawing showing a picturized image by then above apparatus before image compensation when the screen on which an image is displayer forms a curved surface.
Figure 12B:
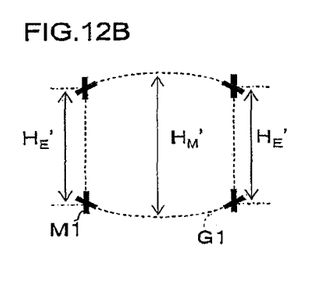
FIG. 12B is a drawing showing an image projected by the apparatus at the time of image compensation.
Figure 12C:
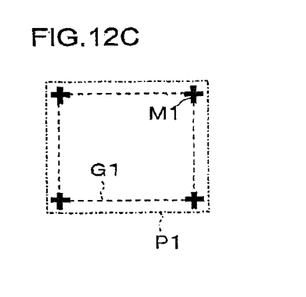
FIG. 12C is a drawing of an image actually displayed at that time.

When the main body 1a of the apparatus 1 exists at the position facing the center of the screen P1 and the imaging device 5 is built in the housing of the main body 1a of the apparatus, and the horizontal section of the screen P1 forms a curve convex to the image displaying apparatus 1 as shown in FIG. 6C, distortions occur in the picturized image G2 as shown in FIG. 12A, and a relation $H_M<H_E$ is concluded between a vertical length $H_M$ at the center and vertical lengths $H_E$ at both sides. The image processing unit 6 calculates quantities of distortions in the picturized image G2. Then, the image processor 6 instructs the controller 7 to project an image G1 in which a relation $H_M'>H_E'$ is concluded between a vertical length $H_M'$ at the center and vertical lengths $H_E'$ at both ends as shown in FIG. 12B, based on the calculation result. The control unit 7 controls the LD 2 and so on and the optical scanning device 4 based on this instruction, and the LD 2 and so on compensates the image G1 based on this control. As a result of the above image compensation, the image G1 actually displayed on the screen P1 becomes a desired shape, for example, a rectangular shape shown in FIG. 12C.

Accordingly, in this embodiment, an image can be displayed on the screen P1 with a desired size and shape with no relation to the light projection direction to the screen P1, that is, the projection direction of the image G1 or the shape of the screen P1. The same effects as those in the first embodiment can be brought in this embodiment.

The present invention is not limited to the above mentioned embodiments and can be modified in various manners corresponding to the intended use included in the scope of the present invention. For example, detection of temporal change of the picturized image G2 may be performed by performing a pattern matching of a temporally prior picturized image and a current picturized image and detecting whether they coincide each other or not. In addition, detection of pointing out the image may be performed by comparing the image G1 memorized in the image processing unit 6 with the picturized image G2. In addition, judgment of presence or absence of the pointing out of the image may be performed based on a time that the image G1 has been pointed out by the pointing means or a motion, for example, a speed of the pointing means on the image G1.

This application is based on Japanese patent application 2007-209748, the contents of which are hereby incorporated by references of the specification and drawings of the patent application.

The invention claimed is:

1. An image display apparatus comprising:
   a light source which emits visible light;
   a scanner which two-dimensionally scans light emitted from the light source to display an image on a screen in synchronism with the light source;
   a controller which controls the light source and the scanner based on data of the image to be displayed on the screen;
   an imaging device which picturizes an image of the image displayed on the screen; and
   a judger which judges presence or absence of a pointing element between the scanner and the screen, based on a temporal change in the image picturized by the imaging device, the pointing element being used to point at a position on the image,
   wherein the judger detects a reduction in a number of pixels which form the image displayed on the screen by comparing a current picturized image with a previous picturized image temporally in each divided picturized image, and judges that pointing out by the pointing element is performed when the detected reduction in the number of pixels is equal to or larger than a lower limit and equal to or smaller than an upper limit.

2. The image display apparatus in accordance with claim 1, further comprising a filter which passes only light of a color which is the same as a color of the light from the light source, the filter being provided between the screen and the imaging device.

3. The image display apparatus in accordance with claim 2, wherein the light source and the scanner further display reference marks on the screen;

the imaging device picturizes images of the reference marks displayed on the screen; and the judger divides the image picturized by the imaging device based on the reference marks.

4. The image display apparatus in accordance with claim 3, wherein the judger detects inclination or distortion of the reference marks picturized by the imaging device; and the image display apparatus further comprises an image compensator configured to compensate an image corresponding to a detection result by the judger.

5. The image display apparatus in accordance with claim 4, wherein the controller controls the light source and the scanner to switch the image displayed on the screen when the judger detects the pointing element on a specific image of the divided images.

6. The image display apparatus in accordance with claim 3, wherein the controller controls the light source and the scanner to switch the image displayed on the screen when the judger detects the pointing element on a specific image of the divided images.

7. The image display apparatus in accordance with claim 1, wherein the light source and the scanner further display reference marks on the screen;

the imaging device picturizes images of the reference marks displayed on the screen; and the judger divides the image picturized by the imaging device based on the reference marks.

8. The image display apparatus in accordance with claim 7, wherein the judger detects inclination or distortion of the reference marks picturized by the imaging device; and the image display apparatus further comprises an image compensator configured to compensate an image corresponding to a detection result by the judger.

9. The image display apparatus in accordance with claim 8, wherein the controller controls the light source and the scanner to switch the image displayed on the screen when the judger detects the pointing element on a specific image of the divided images.

10. The image display apparatus in accordance with claim 7, wherein the controller controls the light source and the scanner to switch the image displayed on the screen when the judger detects the pointing element on a specific image of the divided images.

11. The image display apparatus according to claim 1, wherein the image displayed on the screen includes a plurality of keys that indicates various menus, and when a menu is selected by pointing at one of the plurality of keys with the pointing element, an image including at least one key indicating a low-order menu of the selected menu is displayed on the screen.

\* \* \* \* \*